United States Patent
Glass, II (10) Patent No.: US 10,266,127 B2
(45) Date of Patent: Apr. 23, 2019

(54) RETENTION FEATURES FOR VEHICULAR GLOVEBOXES

(71) Applicant: Toyota Motor Engineering & Manufacturing North America, Inc., Erlanger, KY (US)

(72) Inventor: Rubin T. Glass, II, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/710,970

(22) Filed: Sep. 21, 2017

(65) Prior Publication Data
US 2019/0084488 A1  Mar. 21, 2019

(51) Int. Cl.
  *B60R 13/02* (2006.01)
  *B62D 65/14* (2006.01)
  *B60R 7/06* (2006.01)
  *B60R 11/00* (2006.01)

(52) U.S. Cl.
  CPC ............ *B60R 13/02* (2013.01); *B60R 7/06* (2013.01); *B62D 65/14* (2013.01); *B60R 2011/0005* (2013.01)

(58) Field of Classification Search
  CPC ............. B60R 7/06; B60R 2011/0005; B60R 2013/02; B60R 13/02
  USPC ......................................... 296/37.12, 70, 72
  See application file for complete search history.

(56) References Cited

U.S. PATENT DOCUMENTS

| 5,918,762 | A | 7/1999 | Gaba et al. |
| 7,216,913 | B1 * | 5/2007 | Volsey, II ............... B62J 9/003 296/37.12 |
| 7,926,861 | B2 | 4/2011 | Merlo et al. |
| 7,992,915 | B2 * | 8/2011 | Kwolek ................. B60K 37/00 180/90 |
| 8,146,227 | B2 | 4/2012 | Schmitz et al. |
| 8,631,983 | B2 | 1/2014 | King |
| 9,914,398 | B1 * | 3/2018 | Sanders ................... E05D 3/00 |
| 2016/0129846 | A1 | 5/2016 | Clark et al. |

FOREIGN PATENT DOCUMENTS

| CN | 204098650 | 1/2015 |
| CN | 103568977 | 8/2015 |
| JP | 4214243 | 1/2009 |

* cited by examiner

Primary Examiner — Dennis H Pedder
(74) Attorney, Agent, or Firm — Dinsmore & Shohl LLP (57) ABSTRACT

A vehicular glovebox module, a vehicular glovebox assembly and a method of installing a glovebox module in a vehicle. Mounting apparatus used to secure the glovebox module includes structure to allow a snap-fit engagement of the module to a vehicular support structure. In particular, because the surfaces of the vehicular support structure are not coplanar with one another, at least one of upper and lower retention posts that include snap-fit must provide its snap-fit connection with angled features relative to an installation direction to ensure that the engagement between both the upper and snap-fit connections take place substantially simultaneously during glovebox module installation.

15 Claims, 5 Drawing Sheets

RETENTION FEATURES FOR VEHICULAR GLOVEBOXES

TECHNICAL FIELD

The present specification relates generally to vehicular gloveboxes, and more particularly to devices and methods for improving installation of a glovebox module into a vehicle.

BACKGROUND

A vehicular glovebox is typically formed within a cavity that is in turn formed as part of a dashboard or instrument panel. In one form, the glovebox is a modular assembly made up of a storage compartment, downward pivoting door with latch or related locking feature. In one common approach, the assembly includes a glovebox plate positioned adjacent a glovebox door to form a frame-like structure to which the storage compartment, door or other components making up the module may be secured to the dashboard or other vehicular support structure. Numerous retention posts extend along the vehicular longitudinal direction to act as fasteners to permit snap-fit connection of the module to a corresponding slot, aperture or related opening that is formed in or on such support structure that is within—or forms a part of—the dashboard. Such snap-fit connectivity promotes the installation of the glovebox assembly as a modular unit.

Because the glovebox module is often one of the larger items being mounted to or within the dashboard, its installation at the time of vehicle manufacture requires special care. Moreover, because this module is situated within the dashboard in close proximity to damage-intolerant components or systems such as electrical wiring harnesses, airbags or the like, it becomes incumbent upon the assembly personnel to ensure that the procedure associated with the glovebox module installation takes place as precisely as possible to ensure proper operation of these close-tolerance systems. Unfortunately, such precision hampers the efficiency with which vehicle assembly takes place on an assembly line within a conventional vehicle production facility.

Significantly, the longitudinal installation of a conventional glovebox module is such that retention posts are oriented in order to join the glovebox module and the vehicular support structure along the longitudinal direction of the posts. As such, proper installation depends on having the installation angle of all of the retention posts be parallel to one another. Moreover, the installation direction of the glovebox module is typically set based on the installation direction an uppermost retention post or posts, as these are closer to an installer's line of sight. This is problematic in that the openings formed in the vehicular support structure for receipt of other retention posts are frequently aligned at an off-angle direction relative to the installation direction of these other posts, which in turn necessitates that the installer manipulate the glovebox module through repeated rotation, back-and-forth wiggling and other significant fine-tuning adjustments to ensure the efficacy of the snap-fit connectivity between all of the retention posts and the companion surfaces of the joined support structure. Because this support structure is a highly-integrated component with connection to numerous other vehicular systems and components, any attempt to accommodate all of the posts of the glovebox module by reorienting the openings or related mounting features in the support structure would necessitate a costly redesign that is not viable.

SUMMARY

According to one embodiment of the present disclosure, a vehicular glovebox module is disclosed. The module includes a storage compartment, a door providing selective covering of the storage compartment and mounting apparatus cooperative with at least one of the storage compartment and door in order to effect a snap-fit engagement of the vehicular glovebox module to a vehicular support structure. The mounting apparatus is configured such that it includes at least one upper retention post and at least one lower retention post. The one or more upper retention post or posts have structure formed thereon to promote an upper snap-fit connection with a complementary surface formed on the vehicular support structure, while the one or more lower retention posts have structure formed thereon to provide a lower snap-fit connection. At least one of the snap fit connections extends along a respective surface of the upper or lower retention posts at an angle relative to an installation direction of the mounting apparatus.

According to another embodiment of the present disclosure, a vehicular glovebox assembly is disclosed. The assembly includes a vehicular support structure and a vehicular glovebox module. The glovebox module includes a storage compartment, a door and mounting apparatus, where the mounting apparatus is configured with one or more upper retention posts and one or more lower retention posts to effect a substantially complete snap-fit engagement between the vehicular glovebox module and the vehicular support structure. The snap-fit engagement between one of the upper and lower retention posts and the receiving surface of the support structure is such that the engagement between their adjoining surfaces defines an angled interlocking connection relative to an installation direction of the mounting apparatus.

According to another embodiment of the present disclosure, a method of installing a glovebox module in a vehicle is disclosed. The method includes providing a vehicular dashboard with a support structure that includes numerous snap-fit receiving surfaces thereon, and joining the glovebox module to the support structure along an installation direction such that each of numerous retention posts projecting from the glovebox module substantially along the installation direction form a substantially complete interlocking cooperation with a corresponding one of the snap-fit receiving surfaces. The various retention posts include one or more upper retention posts each defining an upper snap-fit connector and one or more lower retention posts each defining a lower snap-fit connector. At least one of these snap-fit connectors is angled relative to the installation direction.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein allow for the snap-fit engagement between a glovebox module and a corresponding opening or related recess within the support structure that is placed behind the dashboard or instrument panel of a vehicle as a way to promote a consistent assembly process for this part of the vehicle. By creating an angled snap-fit connection between a portion of a mounting apparatus that is part of the glovebox module and a corresponding receiving surface defined on vehicular support structure such as that used to mount or to form the dashboard, instrument panel or other passenger compartment components or modules, the alignment and related effort associated with personnel that perform such installation or assembly of the glovebox module into the vehicle is simplified. Significantly, such installation may take place without having to perform a costly redesign of the entire vehicular support structure.

Figure 1:
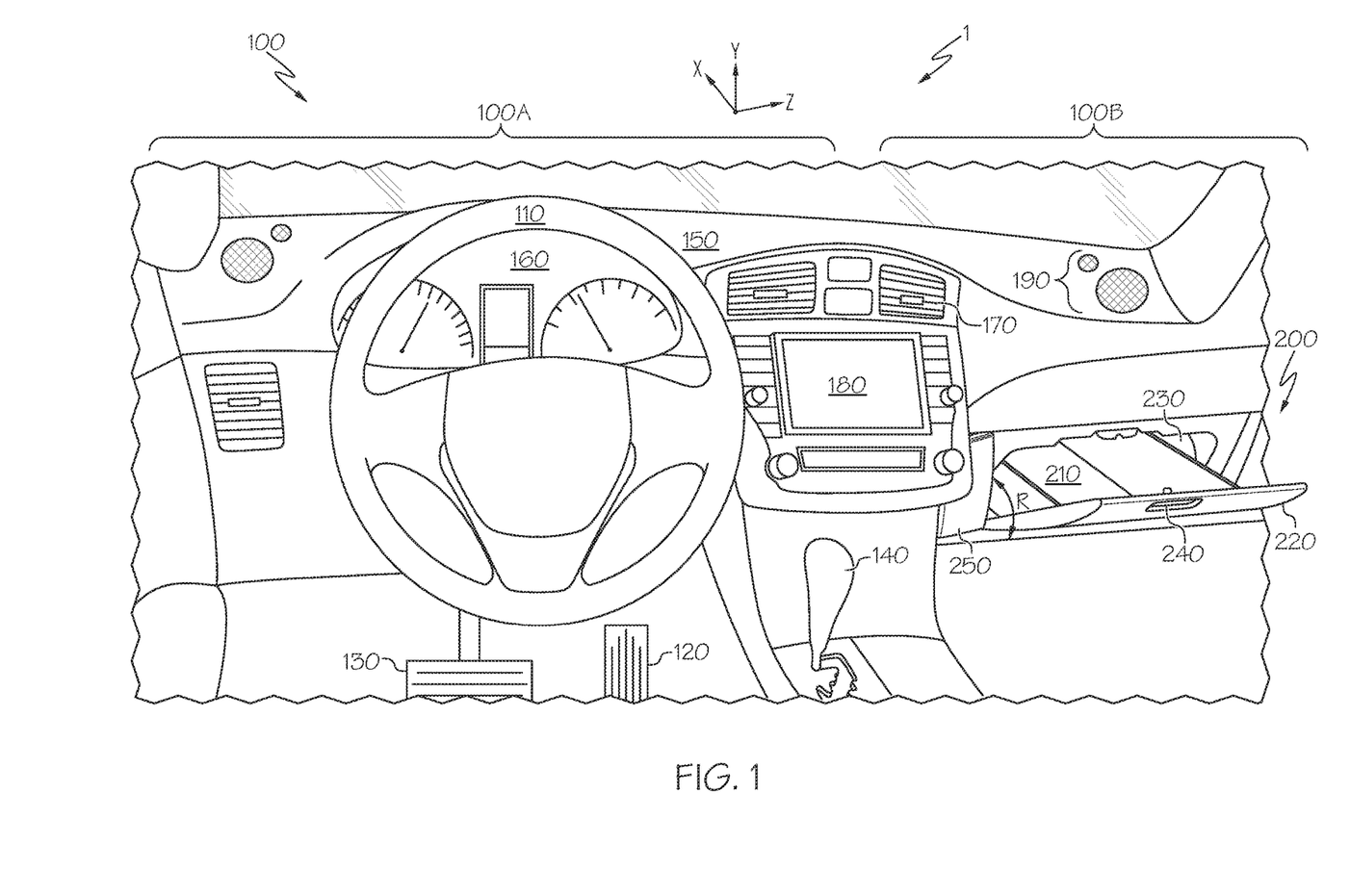
FIG. 1 depicts a view of a driver's position in a vehicle passenger compartment with a glovebox in accordance with one or more embodiments shown or described herein.

Referring first to FIG. 1, a passenger compartment 100 of a motor vehicle 1 is shown in space where the Cartesian coordinates include orthogonal directions associated with the vehicle's respective horizontal longitudinal, vertical height and horizontal lateral axes X, Y and Z. As such, the lengthwise dimension of vehicle 1 is collinear with the longitudinal axis X, while the height dimension of the vehicle 1 is collinear with the height axis Y and the widthwise dimension of the vehicle 1 is collinear with the lateral axis Z. As such, reference to a particular component or portion thereof—as well its orientation along or movement within a particular dimension or direction—will be understood to be within the context of the Cartesian coordinates discussed herein, while slight deviations from the same due to minor misalignment of such components relative to such a spatial reference system are permissible without any loss in generality, and that all such alignments relative to such a system are deemed to be within the scope of the present disclosure.

The vehicle 1 also includes a chassis with a plurality of wheels at least one of which is configured as a driving wheel to propel the vehicle 1 upon receipt of suitable motive power that may be provided through a conventional internal combustion engine (ICE), battery pack, fuel cell stack or a hybrid combination. The chassis may either be of body-on-frame or unibody construction, and both configurations are deemed to be within the scope of the present disclosure. Moreover, the vehicle 1 configuration may include a four-door sedan or other vehicular forms, including coupes, sport utility vehicles (SUVs) minivans, trucks or the like. In one form, the motive power unit is typically situated forward of the passenger compartment 100, although as will be understood that in certain configurations of vehicle 1 (such as those associated with certain sports car configurations), the motive power unit may be situated aft of the passenger compartment, and that all such motive power unit placements are deemed to be within the scope of the present disclosure.

In one form, the passenger compartment 100 is segmented into a driver side 100A and a passenger side 100B. As such, the passenger compartment 100 serves not only as a place to transport a front-seat passenger and—if equipped—rear seat passengers, but also as a place from which a driver may operate vehicle 1 through one or more of a steering wheel 110, accelerator (or throttle) pedal 120, brake pedal 130 and shifter 140 through cooperation with the wheels, motive power unit, transmission and other systems. Dashboard 150 is situated within the passenger compartment 100 and is used to house various instrument clusters 160, heating, ventilation and air conditioning (HVAC) outlets 170, radio or related sound system or telematics unit 180 and accompanying audio speakers 190, as well as other driver or passenger interfaces that are commonly associated with vehicle operability. It will be appreciated that the passenger compartment 100 is shown in a simplified manner, and that in actuality may include other features associated with vehicle 1 operability or driver or passenger convenience. As can be seen, the dashboard 150 may extend not just across the widthwise dimension of the driver side 100A portion of the passenger compartment 100, but to the passenger side 100B as well, and that all such variants—depending on the configuration of vehicle 1 and its passenger compartment 100—are within the scope of the present disclosure. Likewise, the dashboard 150 may include or be rigidly affixed to unexposed firewall, framework, chassis or related support structure the latter of which is described in more detail below.

A glovebox module 200 is shown disposed on a lower portion of the dashboard 150 that corresponds to the passenger side 100B of passenger compartment 100. In one form, the glovebox module 200 includes a storage compartment 210. A generally rectangular door 220 is pivotally mounted to extend through rotational movement R about an axis that extends along a lower edge of an opening 230 defined within the dashboard 150 in order to provide selective covering of the storage compartment 210. In one form, a latch 240 is disposed within a passenger-facing surface of the door 220 in order to provide a locking or related closure mechanism. A portion of a mounting apparatus 250 includes a frame-like structure that is connected to one or both of the storage compartment 210 and door 220.

Figure 2:
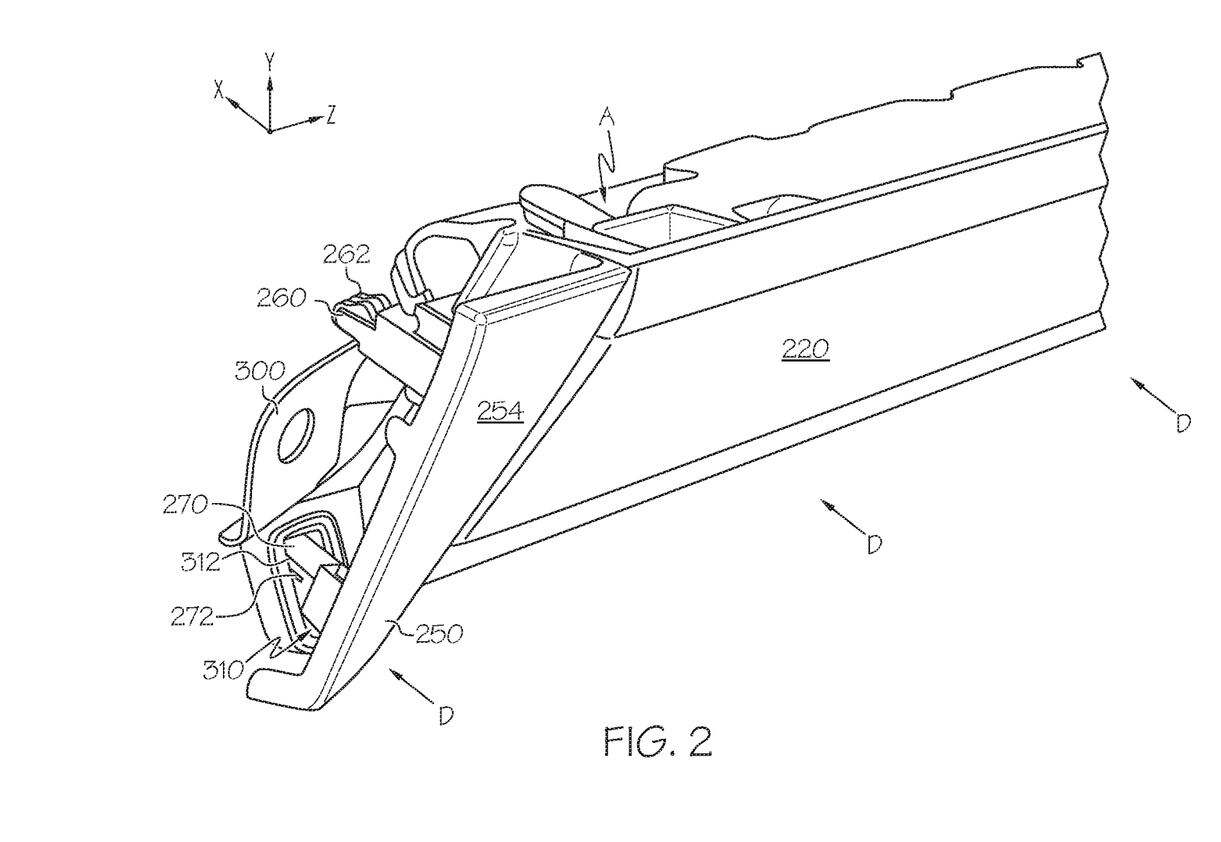
FIG. 2 depicts a front perspective detail view of the passenger compartment-facing front surface of the door and mounting apparatus of the glovebox module of FIG. 1 while in a partially-assembled state relative to the vehicular support structure.

Referring next to FIG. 2, in operation, the mounting apparatus 250 provides the structural or mechanical link between the glovebox module 200 and a rigid vehicular support structure 300 that is situated between the dashboard 150 and a firewall (not shown) or other rigid structure associated with the chassis. Although only shown partially, it will be understood that in one form, such support structure 300 may extend across at least a portion of a length or height associated with the dashboard 150 such that one or more of the dashboard 150 and the various components (such as those depicted in FIG. 1) that are disposed within or mounted thereto may be rigidly affixed in order to provide a secure mounting location. As such, the support structure 300 may also include other surfaces and related fastening or mounting hardware. The frame-like structure of the mounting apparatus 250 is configured to effect a snap-fit engagement of the vehicular glovebox module 200 through a corresponding edge 312 that is formed in each of one or more generally rectangular apertures 310 that are defined within a surface of the vehicular support structure 300. In one form, this mounting apparatus 250 is formed to extend rearwardly (that is, along the longitudinal X-dimension as shown) from a surface 252 that faces the vehicular support structure 300 (as shown with more particularity in FIG. 3), while the opposing surface forms a plate 254 that faces outward such that it can be viewed by a passenger or driver in the passenger compartment 100. The plate 254 may be outfitted with surface texture, color or other features as a way to form a measure of aesthetic continuity with the glovebox door 220.

The mounting apparatus 250 includes one or more upper retention posts 260 and one or more lower retention posts 270. In one form, there are two upper retention posts 260 and two lower retention posts 270 that are generally aligned at the four corners of the glovebox module 200 so that each upper retention post 260 is formed substantially above a corresponding lower retention post 270, although it will be appreciated that placement of the upper and lower retention posts 260, 270 depend on the design and placement of the corresponding engaging surfaces of the vehicular support structure 300, and that in other forms such precise vertical alignment is not required. In one form, a first structure is integrally formed as a snap-fit protuberance along the surface that projects along the Y-axis to define an upper snap-fit connector 262, while a second structure is integrally formed along the surface that projects along the Z-axis as a snap-fit protuberance to define at least one lower snap-fit connector 272 that is angled relative to an installation direction D of the mounting apparatus 250 in such a way to ensure a substantially complete interlocking cooperation between the lower snap-fit connector 272 and a corresponding snap-fit receiving surface formed on the vehicular support structure 300. Within the present context, such a substantially complete interlocking cooperation includes those snap-fit connections where the interference fit being formed between adjacent snap-fit surfaces is such that at least a majority of these adjacent connector surfaces are in contact with one another, an example of which is shown and described in conjunction with FIG. 5 below. In one particular form, such adjacent surface contact may be over a substantial entirety of (a) at least the shorter of the two surfaces in configurations where the linear length of one of the surfaces is less than the other or (b) both of the two surfaces in configurations where the linear length of both of the surfaces is substantially similar. In this way, upon the linear insertion along an installation direction D of the glovebox module 200, the mounting apparatus 250, its retention posts 260, 270 and the respective snap-fit connectors 262, 272 formed thereon ensures a secure, tight joining of the glovebox module 200 to the dashboard 150. Within the present context, the term "installation direction" as it pertains to the glovebox module 200 is that direction D that may extend along a general longitudinal dimension (that is to say, the X-axis as shown) of the vehicle 1 in order to effect the linear insertion of the glovebox module 200 to the dashboard 150. In some embodiments, the installation direction D is substantially parallel to an elongated axis of the upper and lower retention posts 260, 270.

Figure 3:
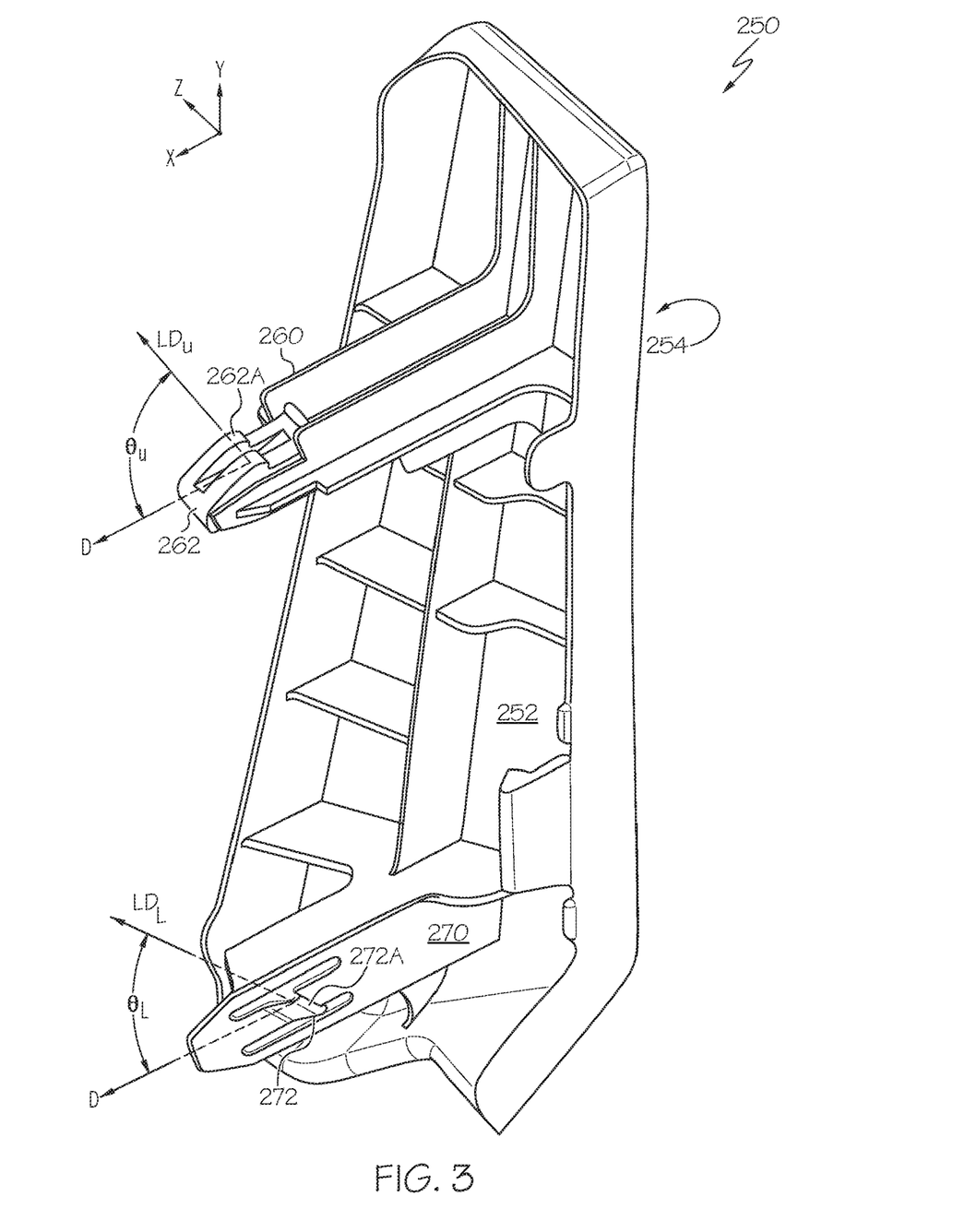
FIG. 3 depicts a partial rear perspective isolation view of the mounting apparatus portion of the glovebox module of FIG. 1.
Figure 4:
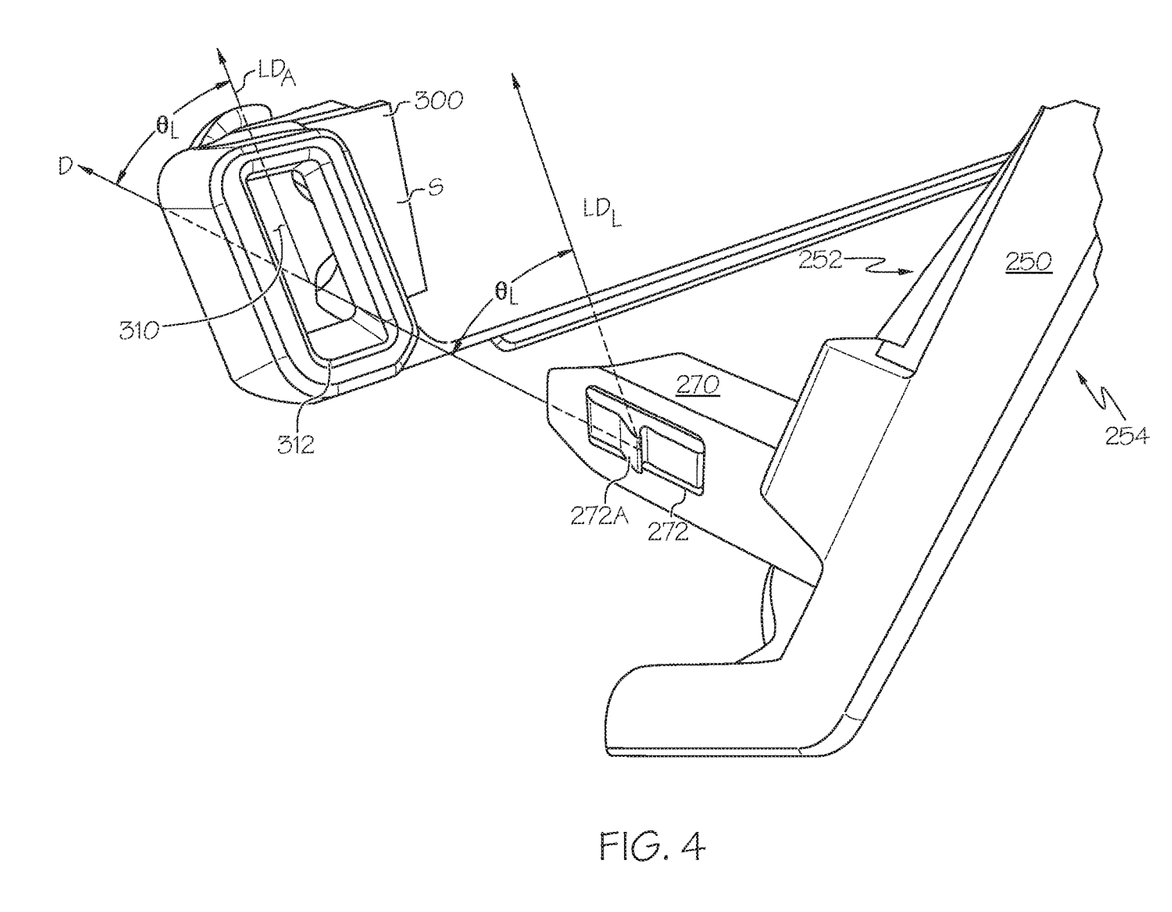
FIG. 4 depicts a front perspective detail view of one of the lower retention posts and accompanying snap-fit connectors of FIG. 3 prior to being snap-fit along an installation direction into the edge of aperture that is formed in the vehicular support structure.

Referring next to FIGS. 3 and 4, details associated with the rearward-facing inner surface 252 of the mounting apparatus 250 and how the lower retention post 270 and its integrally-formed lower snap-fit connector 272 engage with a mating snap-fit receiving surface that makes up a portion of the vehicular support structure 300 are shown. As discussed above in conjunction with FIG. 2, the mounting apparatus 250 is secured to (or forms a part of) glovebox module 200 of FIG. 1 such that together they may be joined to the dashboard 150 through the linear snap-fit joining of the glovebox module 200 to one of the edges 312 of the rectangular aperture 310 or related complementary-shaped and sized portion of vehicular support structure 300.

Referring with particularity to FIG. 3, the rearward-facing inner surface 252 is generally opposite of the surface defined by plate 254. In one form, the rearward-facing inner surface 252 includes various ribs, spars or related structural enhancements 252A in order to promote greater rigidity or load-bearing capability of mounting apparatus 250. In one form, the mounting apparatus 250 may be made from known resin-based materials suitable for injection molding, such as polypropylene or other suitable plastic. Such material choice and fabrication method is particularly useful for fabricating the mounting apparatus 250, the structural enhancements 252A and the upper and lower retention posts 260, 270 that extend rearwardly as part of an integral, unitary structure.

The upper retention post 260 and its companion upper snap-fit connectors 262 are oriented such that the deflection of both take place out of the plane formed by the X-Z axes (that is to say, along the Y-axis). As such, in order to form the substantially complete interlocking cooperation between the upper snap-fit connector or connectors 262 and the corresponding edge or related surface (not shown) of the vehicular support structure 300, a protuberance 262A that defines the surface of the upper snap-fit connector 262 is arranged to extend along the Z-axis dimension that is substantially orthogonal to the installation direction D. This extension is shown as linear direction $LD_U$, with a resulting upper snap-fit angle $\theta_U$ that is oriented 90° relative to the installation direction D. In this way, a snap-fit coupling between the protuberance 262A of the upper snap-fit connector 262 and a corresponding upper snap-fit receiving surface (not shown) that is formed on the vehicular support structure 300 can be made to take place along a common linear contact that is normal (that is to say, orthogonal) to the installation direction D.

The lower retention post 270 is oriented to extend along the installation direction D. The companion lower snap-fit connector 272 is oriented such that the linear direction $LD_L$ of a protuberance 272A extends along an oblique dimension that defines an acute angle relative to the installation direction D which in one form may be substantially aligned with the longitudinal axis X of the vehicle 1; this is shown by lower snap-fit angle $\theta_L$. The protuberance 272A is thus the linear, elongate surface of the lower snap-fit connector 272 that forms the substantially complete interlocking cooperation with the edge 312 of the aperture 310 of FIG. 2. Thus, upon joining of the glovebox module 200 to the vehicular support structure 300, the protuberance 272A and the edge 312 form a linearly elongate common contact surface 400 (as shown and discussed in conjunction with FIG. 5) such that the resulting interference—coupled with the elastically resilient bias—maintains a close-tolerance, secure fit of the lower portion of the mounting apparatus 250 to the corresponding lower snap-fit receiving portion of the vehicular support structure 300. As a result, because the snap-fit coupling of the upper snap-fit connector or connectors 262 to the corresponding upper snap-fit receiving portion of the vehicular support structure 300 takes place substantially simultaneously (so long as the glovebox module 200 is joined to the vehicular support structure 300 along installation direction D), the entire installation operation takes place through one continuous linear movement of the glovebox module 200 toward the dashboard 150. While the lower snap-fit connector 272 is shown with an I-shaped configuration, it will be appreciated that any relatively rigid shape suitable to form the linearly elongate common contact surface by protuberance 272A along the linear direction $LD_L$ is sufficient, and that all such variants are deemed to be within the scope of the present disclosure.

Unlike the upper snap-fit angle $\theta_U$ that is defined within the plane formed by the X-Z axes, the lower snap-fit angle $\theta_L$ is substantially coplanar with a plane formed by the X-Y axes of the Cartesian coordinates shown. This differing planar orientation of the protuberances 262A, 272A that define the upper and lower snap-fit connectors 262, 272 has the effect of causing the lower retention post 270 to deflect in at a right angle relative to the upper retention post 260 during the snap-fit joining of the glovebox module 200 to the vehicular support structure 300. In particular, the lower retention post 270 deflects along the Z-axis as shown. This differing deflection directions of the retention posts 260, 270 that are substantially aligned along the installation direction D while having different snap-fit angles $\theta_U$ and $\theta_U$ means that geometric variations within the vehicular support structure 300, such as offsets, non-coplanar mounting surfaces or the like, can be accounted for in order to allow installation of the glovebox module 200 without having to resort to glovebox module 200 rotation, wiggling or other manipulations that are not along the installation direction D.

It will be appreciated that within the present context, the terms "angle relative", "angled" and their variants are meant to describe an acute or obtuse angle formation between the contacting surfaces of the lower snap-fit connector 272 and the corresponding snap-fit receiving surface (presently shown as edge 312) formed on the vehicular support structure 300 where the lower snap-fit angle $\theta_L$ is measured relative to the installation direction D. In other words, an acute angle is formed relative to the installation direction is such that $0°<\theta<90°$, while an obtuse angle is formed relative to the installation direction is such that $90°<\theta<180°$. While the remainder of the present disclosure uses the acute angle as an example, it will be appreciated that an obtuse angle is equally applicable, and as such is within the scope of the present disclosure within the context of when an angled snap-fit connection is discussed. As such, it will be understood that a snap-fit engagement that takes place between a connector and a corresponding part of a vehicular support structure as discussed herein that results from configuring an angled relationship between the connector and an installation direction of a mounting apparatus to which the connector is attached, affixed or otherwise secured results in promoting as much contact surface as possible between the interlocking parts of each of the connector and vehicular support surface.

Referring with particularity to FIG. 4, the edge 312 of the aperture 310 forms a seat upon which the snap-fit engagement with the lower snap-fit connector 272 takes place. In addition, the rectangular opening formed by the aperture 310 is angled relative to the installation direction D along a linear direction $LD_A$ that extends in a planar manner along the surface S defined by the peripheral edges 312. This surface S possesses the same amount of angular offset as the lower snap-fit angle $\theta_L$ of the lower snap-fit connector 272, while the peripheral edge 312 forms four generally linear snap-fit receiving surfaces. In this way, the opening is offset relative to the plane formed by the X-Z axes by an acute angle that is the same as the lower snap-fit angle $\theta_L$ formed by the linear direction $LD_L$ of the protuberance that defines the surface of the lower snap-fit connector 272. As such, the elongate linear dimension of the lower snap-fit connector protuberance 272A and the edges 312 that define the aperture 310 can be substantially coplanar with one another to promote a maximum amount of common surface contact between them. Moreover, by forming the vehicular support structure 300 in general and the edges 312 in particular from relatively rigid materials (such as heavy-duty plastics, metals or the like) that resist elastic deformation, ease of the ensuing snap-fit connection may be improved, especially when the snap-fit connectors 262, 272 of the upper and lower retention posts 260, 270 are configured to substantially experience elastic deformation when the two joining surfaces are brought into contact with one another.

Although FIGS. 3 and 4 depict that it is the lower snap-fit connector 272 that has the angled substantially complete interlocking connectivity to the edge 312 of aperture 310, the present disclosure is not so limited in that in another form, the upper snap-fit connector 262—which is shown as having a generally orthogonal (that is to say, non-angled) interlocking connectivity relative to an installation direction D of the mounting apparatus 250—could in addition to or instead of the lower retention post 270 have such angled connectivity so long as the companion snap-fit receiving surface (not shown) is sized, shaped and oriented in a manner similar to that of the lower retention post 270 and aperture 310 as shown.

Figure 5:
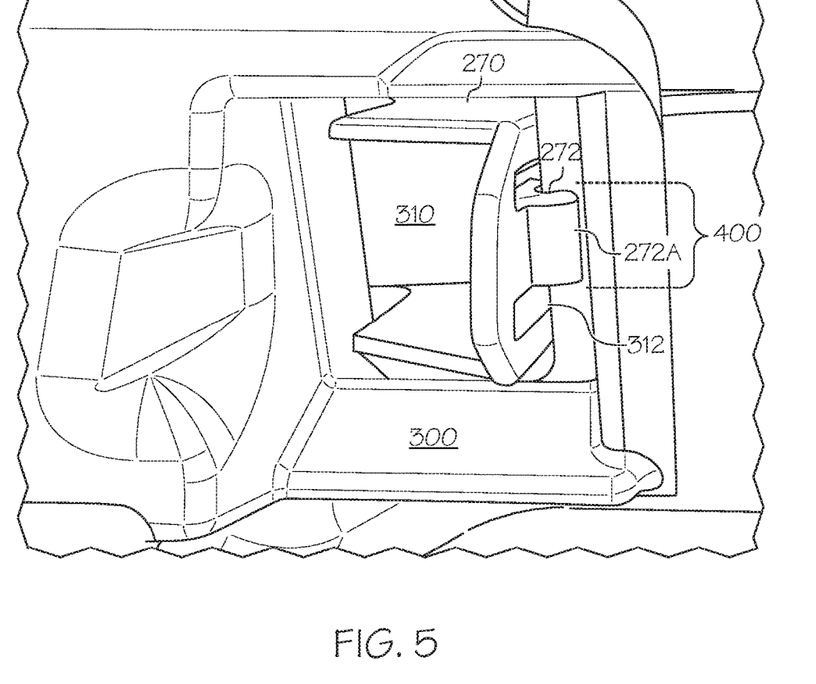
FIG. 5 depicts a rear view of the substantially complete interlocking cooperation between the lower snap-fit connector and a corresponding snap-fit receiving surface once the glovebox module has been affixed to the vehicular support structure.

Referring next to FIG. 5, a view from behind the dashboard 150 looking toward the passenger compartment 100 (both as shown in FIG. 1) shows the substantially complete interlocking cooperation between the lower snap-fit connector 272 and one edge 312 of an aperture 310 that is formed in the vehicular support structure 300. As can be seen, a linearly elongate region of common contact surface 400 takes place where the two joining surfaces of protuberance 272A of the lower snap-fit connector 272 and edge 312 are brought into contact with one another as a result of advancing the mounting apparatus 250 of FIGS. 2 through 4 toward the vehicular support structure 300 along the installation direction D.

The above-described mounting apparatuses including upper retention posts and lower retention posts are generally aligned in the installation direction and each retention post may include snap-fit protuberances that can be used to engage cooperating engaging surfaces of vehicular support structures during installation of glovebox modules. The snap-fit protuberances of the lower retention posts may extend across an outboard side of the lower retention posts in a direction that is oblique to the installation direction and the corresponding elongated axes of the associated lower retention posts. Such an oblique orientation of the snap-fit protuberances facilitate engagement with the engaging surfaces that are also oblique to the installation direction to provide a substantially complete interlocking connection between the lower snap-fit protuberances and their corresponding engaging surfaces.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, various features of the apparatus may be combined, added, removed, reordered, modified or the like, and still be within the scope of the present disclosure, while the order of steps associated with methods to produce the apparatus may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular glovebox module comprising:
a storage compartment;
a door providing selective covering of the storage compartment; and
a mounting apparatus connected to the storage compartment that provides a snap-fit engagement to a vehicular support structure, the mounting apparatus comprising:
at least one upper retention post comprising an upper snap-fit connector formed thereon; and
at least one lower retention post comprising a lower snap-fit connector formed thereon,
wherein the lower snap-fit connector extends along a surface of the lower retention post, the lower snap-fit connector having an engagement surface that extends in a vehicle vertical direction at an angle that is oblique relative to an installation direction of the lower retention post, the engagement surface arranged to engage a snap-fit surface of a corresponding edge of the vehicular support structure arranged at an angle that is also oblique to the installation direction to connect the glovebox module to the vehicular support structure.

2. The vehicular glovebox module of claim 1, whereupon insertion of the glovebox module into a vehicular passenger compartment, the mounting apparatus defines an outer surface that substantially faces such passenger compartment and an inner surface substantially opposite of the mounting apparatus outer surface.

3. The vehicular glovebox module of claim 2, wherein both the at least one upper retention post and the at least one lower retention post extend along the installation direction from the mounting apparatus inner surface to define a resiliently-deformable cantilevered structure.

4. The vehicular glovebox module of claim 1, wherein the mounting apparatus defines a frame that is configured to be laterally disposed relative to at least one of the storage compartment and the door.

5. The vehicular glovebox module of claim 4, wherein the at least one upper retention post and the at least one lower retention post are integrally formed with the frame.

6. The vehicular glovebox module of claim 5, wherein the at least one upper retention post and the at least one lower retention post and frame comprise a plastics-based material.

7. The vehicular glovebox module of claim 1, wherein the engagement surface extends at the angle that is oblique relative to the installation direction in such a way to ensure a substantially complete interlocking cooperation between the engagement surface and the snap-fit surface.

8. A vehicle comprising:
a dashboard comprising vehicular support structure having an aperture and a snap-fit surface that extends along the aperture; and
a vehicular glovebox module comprising:
a storage compartment;
a door providing selective covering of the storage compartment; and
a mounting apparatus connected to the storage compartment providing a snap-fit engagement of the vehicular glovebox module to the vehicular support structure, the mounting apparatus comprising:
at least one upper retention post comprising an upper snap-fit connector formed thereon; and
at least one lower retention post comprising a lower snap-fit connector formed thereon, the at least one lower retention post received within the aperture,
wherein the lower snap-fit connector extends along a surface of the lower retention post, the lower snap-fit connector having an engagement surface that extends in a vehicle vertical direction at an angle that is oblique relative to an installation direction of the lower retention post, the engagement surface arranged to engage the snap-fit surface arranged at an angle that is also oblique to the installation direction connecting the glovebox module to the vehicular support structure.

9. The vehicle of claim 8, wherein the lower snap-fit connector is configured to elastically deform in response to contact with an edge of the aperture during insertion of the lower retention post into the aperture.

10. The vehicle of claim 8, wherein the engagement surface and the snap fit surface are interlocked.

11. A method of installing a glovebox module in a vehicle, the method comprising:
providing a vehicular dashboard with a support structure having an aperture and a snap-fit surface that extends along the aperture; and
joining the glovebox module to the support structure along an installation direction such that a lower retention post extending outward from the glovebox module along the installation direction forms an interlocking cooperation with the snap-fit surface while located in the aperture of the support structure, the lower retention post comprising
a lower snap-fit connector formed thereon,
wherein the lower snap-fit connector extends along a surface of the lower retention post, the lower snap-fit connector having an engagement surface that extends in a vehicle vertical direction at an angle that is oblique relative to an installation direction of the lower retention post, the engagement surface engaging the snap-fit surface arranged at an angle that is also oblique to the installation direction joining the glovebox module to the support structure.

12. The method of claim 11, wherein the joining the glovebox module to the support structure along an installation direction comprises:
placing the glovebox module adjacent the vehicular dashboard;
substantially aligning an upper retention post and the lower retention post to respective snap-fit surfaces of the vehicular support structure; and
advancing the glovebox module toward the vehicular dashboard until the interlocking cooperation is established between the upper and lower retention posts and the vehicular support structure.

13. The method of claim 12, wherein the lower snap-fit connector is configured to elastically deform in response to contact with an edge of the aperture during insertion of the lower retention post into the aperture.

14. The method of claim 11, wherein the glovebox module further comprises an upper retention post comprising an upper snap-fit connector.

15. The method of claim 14, wherein the upper retention post extends outward from the glovebox module along the installation direction.

\* \* \* \* \*